(12) United States Patent
Jones

(10) Patent No.: US 11,971,255 B2
(45) Date of Patent: Apr. 30, 2024

(54) LASER LEVEL ALIGNMENT TOOL

(71) Applicant: Milwaukee Electric Tool Corporation, Brookfield, WI (US)

(72) Inventor: Benjamin T. Jones, St. Francis, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 156 days.

(21) Appl. No.: 17/517,289

(22) Filed: Nov. 2, 2021

(65) Prior Publication Data

US 2022/0136829 A1 May 5, 2022

Related U.S. Application Data

(63) Continuation of application No. PCT/US2021/057583, filed on Nov. 1, 2021.

(60) Provisional application No. 63/108,546, filed on Nov. 2, 2020.

(51) Int. Cl.
*G01C 15/00* (2006.01)
*G01B 11/27* (2006.01)

(52) U.S. Cl.
CPC .......... *G01C 15/004* (2013.01); *G01B 11/272* (2013.01)

(58) Field of Classification Search
CPC ............................ G01C 15/004; G01B 11/272
See application file for complete search history.

(56) References Cited

U.S. PATENT DOCUMENTS

| | | |
|---|---|---|
| 4,836,669 A | 6/1989 | Teach |
| 5,033,709 A | 7/1991 | Yuen |
| 5,218,770 A | 6/1993 | Toga |
| 5,782,003 A | 7/1998 | Bozzo |
| 6,398,175 B1 | 6/2002 | Conner et al. |
| 6,754,969 B2 | 6/2004 | Waibel |
| 6,763,596 B1 | 7/2004 | Puri et al. |
| 6,931,739 B2 | 8/2005 | Chang et al. |
| 6,947,820 B2 | 9/2005 | Ohtomo et al. |
| 6,964,106 B2 | 11/2005 | Sergyeyenko et al. |
| 7,148,958 B2 | 12/2006 | Ohtomo et al. |
| 7,174,648 B2 | 2/2007 | Long et al. |
| 7,178,250 B2 | 2/2007 | Nash et al. |
| 7,181,854 B2 | 2/2007 | Long et al. |
| 7,191,532 B2 | 3/2007 | Long et al. |
| 7,237,341 B2 | 7/2007 | Murray |
| 7,260,895 B2 | 8/2007 | Long et al. |

(Continued)

FOREIGN PATENT DOCUMENTS

| | | |
|---|---|---|
| KR | 20-2009-0010563 | 10/2009 |
| WO | WO15096060 | 7/2015 |
| WO | WO18147433 | 8/2018 |

OTHER PUBLICATIONS

International Search Report and Written Opinion for International Application No. PCT/US2021/057583, dated Nov. 1, 2021, 10 pages.

*Primary Examiner* — John Fitzgerald
*Assistant Examiner* — Tania Courson
(74) *Attorney, Agent, or Firm* — Reinhart Boerner Van Deuren s.c.

(57) ABSTRACT

A laser level alignment tool is shown. The laser level alignment tool includes magnetic mounts located along a perimeter of body. A laser level is coupled to the body off center from a center point of the laser level alignment tool. The magnetic mounts may be height adjustable relative to the body.

19 Claims, 5 Drawing Sheets

(56) References Cited

U.S. PATENT DOCUMENTS

| | | | |
|---|---|---|---|
| 7,310,887 B2 | 12/2007 | Nash et al. | |
| 7,316,073 B2 | 1/2008 | Murray | |
| 7,322,116 B2 | 1/2008 | Long et al. | |
| 7,392,591 B2 | 7/2008 | Milligan et al. | |
| 7,441,981 B2 * | 10/2008 | Crain | F16M 13/022 |
| | | | 403/321 |
| 7,454,839 B2 * | 11/2008 | Della Bona | F16M 11/14 |
| | | | 33/291 |
| 7,469,481 B2 | 12/2008 | Nash et al. | |
| 7,669,816 B2 | 3/2010 | Crain et al. | |
| 7,675,612 B2 * | 3/2010 | Kallabis | G01C 15/10 |
| | | | 356/138 |
| 7,764,365 B2 | 7/2010 | Nichols et al. | |
| 7,797,844 B2 | 9/2010 | Hobden et al. | |
| 7,992,310 B2 | 8/2011 | Litvin et al. | |
| 8,023,178 B2 | 9/2011 | Kodaira | |
| 8,087,176 B1 | 1/2012 | Hayes et al. | |
| 8,191,851 B2 | 6/2012 | Crown | |
| 8,267,365 B2 | 9/2012 | Wiest et al. | |
| 8,281,495 B2 | 10/2012 | Hayes et al. | |
| 8,490,937 B2 | 7/2013 | Crain et al. | |
| 8,511,635 B2 | 8/2013 | Steffen | |
| 8,595,946 B2 | 12/2013 | Hayes et al. | |
| 8,668,182 B2 * | 3/2014 | Steffen | G01D 11/30 |
| | | | 248/689 |
| 8,745,884 B2 | 6/2014 | Hayes | |
| 8,943,701 B2 | 2/2015 | Hayes et al. | |
| 9,389,074 B2 | 7/2016 | Esposito | |
| 9,441,963 B2 | 9/2016 | Yuen et al. | |
| 9,513,121 B2 | 12/2016 | Kallabis | |
| D812,452 S | 3/2018 | Matteo | |
| 10,145,676 B2 | 12/2018 | Hayes et al. | |
| 11,287,258 B2 * | 3/2022 | Gould | B25F 5/021 |
| 2005/0198845 A1 | 9/2005 | Robinson | |
| 2005/0223572 A1 | 10/2005 | Davis | |
| 2007/0113412 A1 | 5/2007 | Kallabis | |
| 2010/0243833 A1 | 9/2010 | Kane, Jr. et al. | |
| 2010/0276555 A1 | 11/2010 | Steffen et al. | |
| 2019/0056215 A1 | 2/2019 | Hayes et al. | |
| 2020/0083658 A1 | 3/2020 | Xu | |
| 2020/0225034 A1 | 7/2020 | Gould et al. | |

* cited by examiner

LASER LEVEL ALIGNMENT TOOL

CROSS-REFERENCE TO RELATED APPLICATION

This application is a continuation of International Patent Application No. PCT/US2021/057583, filed Nov. 1, 2021, which claims benefit of and priority to U.S. Provisional Application No. 63/108,546, filed Nov. 2, 2020, the contents of which are incorporated herein by reference in their entireties.

BACKGROUND OF THE INVENTION

The present invention relates generally to the field of laser levels. The present invention relates specifically to an alignment tool for supporting a laser level to allow for alignment of the laser level as desired by a user.

SUMMARY OF THE INVENTION

One embodiment of the invention relates to a laser level alignment tool. The laser level alignment tool includes a body or plate having an upper surface, a lower surface, and a sidewall extending between the upper and lower surface. The sidewall defines an outer perimeter of the plate. The laser level alignment tool includes an alignment feature slidable along the plate from a position adjacent a center point of the plate to a second position spaced from the center point of the plate. A laser level is coupled to the plate such that a center of gravity of the laser level is offset from a center of gravity of the plate. The laser level is coupled to the plate such that a laser beam is projected perpendicular to a lower surface of the plate at a position to intersect with the center point of a plate and downward portion of the laser beam is alignable with a reference mark. The laser level alignment tool further comprises a plurality of magnetic mounts coupled to the outer perimeter of the plate.

In various embodiments, the magnetic mounts are height adjustable such that they translate in a direction perpendicular to the plate. In various embodiments, the magnetic mounts include a plurality of horizontal ribs that snap engage to the plate, setting a plurality of preselected magnetic mount heights relative to an upper surface of the plate. In various embodiments, the alignment features are slidable within channels formed within the plate. In some such embodiments, the alignment features are separate from the magnetic mounts and in specific embodiments, the alignment features include no magnets for attachment.

Another embodiment relates to a laser level alignment tool that includes a plate. The plate has a surface defined by an outer perimeter. A frame configured to suspend a laser level from the plate is coupled to the plate. A first pair of alignment features and a second pair of alignment features are adjustably coupled to the surface of the plate. Further, a plurality of magnetic mounts are coupled to the outer perimeter of the plate.

Another embodiment relates to a laser level alignment tool that includes a body configured to support a laser level. The body includes an upper surface, a lower surface that is opposite the upper surface, and a sidewall that extends at least in part between the upper surface and the lower surface. The sidewall defines an outer perimeter of the body. A frame is coupled to the body and is configured to support a laser level at least in part below the lower surface. A first magnetic mounting structure and a second magnetic mounting structure, spaced apart from one another, are each adjustably coupled to the exterior of the sidewall for translation in a direction perpendicular to the upper surface.

Another embodiment relates to a laser level alignment tool that includes a plate. The plate has a plate center of gravity and a plate center point. The plate includes an upper surface, a lower surface, and a sidewall that extends between the upper surface and the lower surface. A frame is coupled to the lower surface. The frame is configured to support a laser level that has a laser level center of gravity. The frame is configured to support the laser level in a position such that the laser level center of gravity is offset from the plate center of gravity. A plurality of adjustable alignment features are coupled to at least the upper surface of the plate. Further, a plurality of magnetic mounts are coupled to the sidewall of the plate.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments, and together with the description serve to explain principles and operation of the various embodiments.

DETAILED DESCRIPTION

Referring generally to the figures, various embodiments of a laser level alignment tool are shown. As will be generally understood, there are a variety of building or construction steps in which relative alignment (e.g., to a plan, blueprints, reference points, etc.) is performed by a worker to locate/position a workpiece, tool, fixture, etc. to perform a task at the desired position. As will be discussed in more detail below, Applicant has developed a laser level alignment tool useful for supporting a laser level in a manner that aligns a center point of the laser level alignment tool with one or more projected laser lines which in turn can be aligned with a desired reference point while providing for stable and off-center support for the laser level.

In particular, the laser level alignment tool discussed herein includes a plate with a center point. A laser level is coupled to the plate such that one or more projected laser beams (e.g., projected lines, projected laser planes, etc.) are projected to intersect the center point of the plate. In use, the laser level alignment tool is positioned such that the opposite end of the project laser beam intersects the desired reference point allowing the user to align the center point of the plate with the reference point. Applicant's laser level alignment tool discussed herein includes magnet mounting structures designed to provide a variety of improved functions.

To provide for use of wide range of laser level devices including planar laser level devices, the laser level alignment tool discussed herein mounts the laser level in a position such that the center of gravity of the laser level is off-set from the center of the laser level alignment tool. To accommodate and support this off-center positioning, Applicant has designed the laser level alignment tool with mounting magnets located around the perimeter of the alignment tool. Applicant has found that, in contrast to other mounting arrangements, the perimeter location of the mounting magnets provides for robust support even for off-center positioning of relatively heavy laser levels. Further, Applicant's magnet mounting structures are separate from the inner alignment features and are also height adjustable which Applicant has found provides for easier use on the jobsite.

Figure 1:
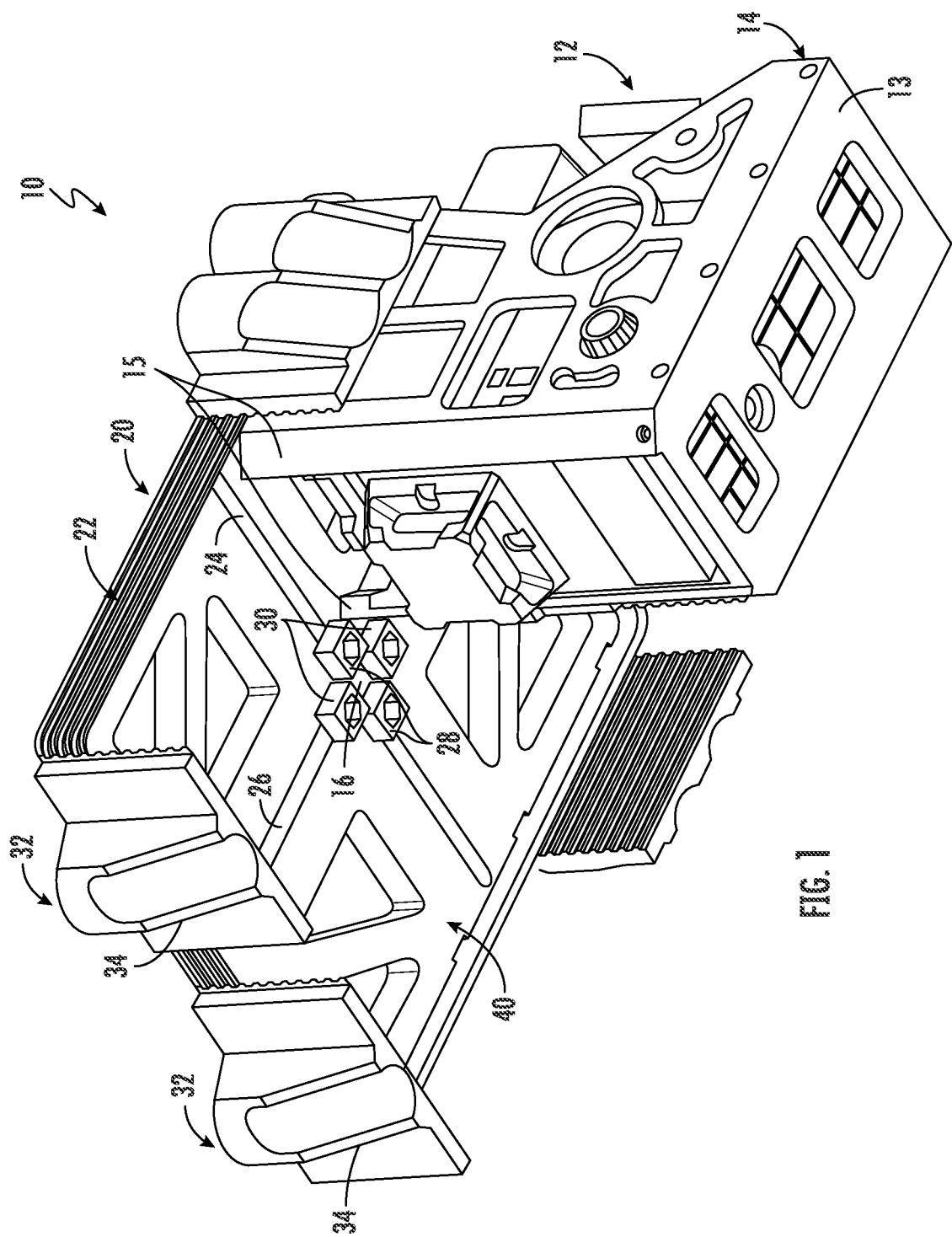
FIG. 1 is a perspective view from below of a laser level alignment tool, according to an exemplary embodiment.
Figure 2:
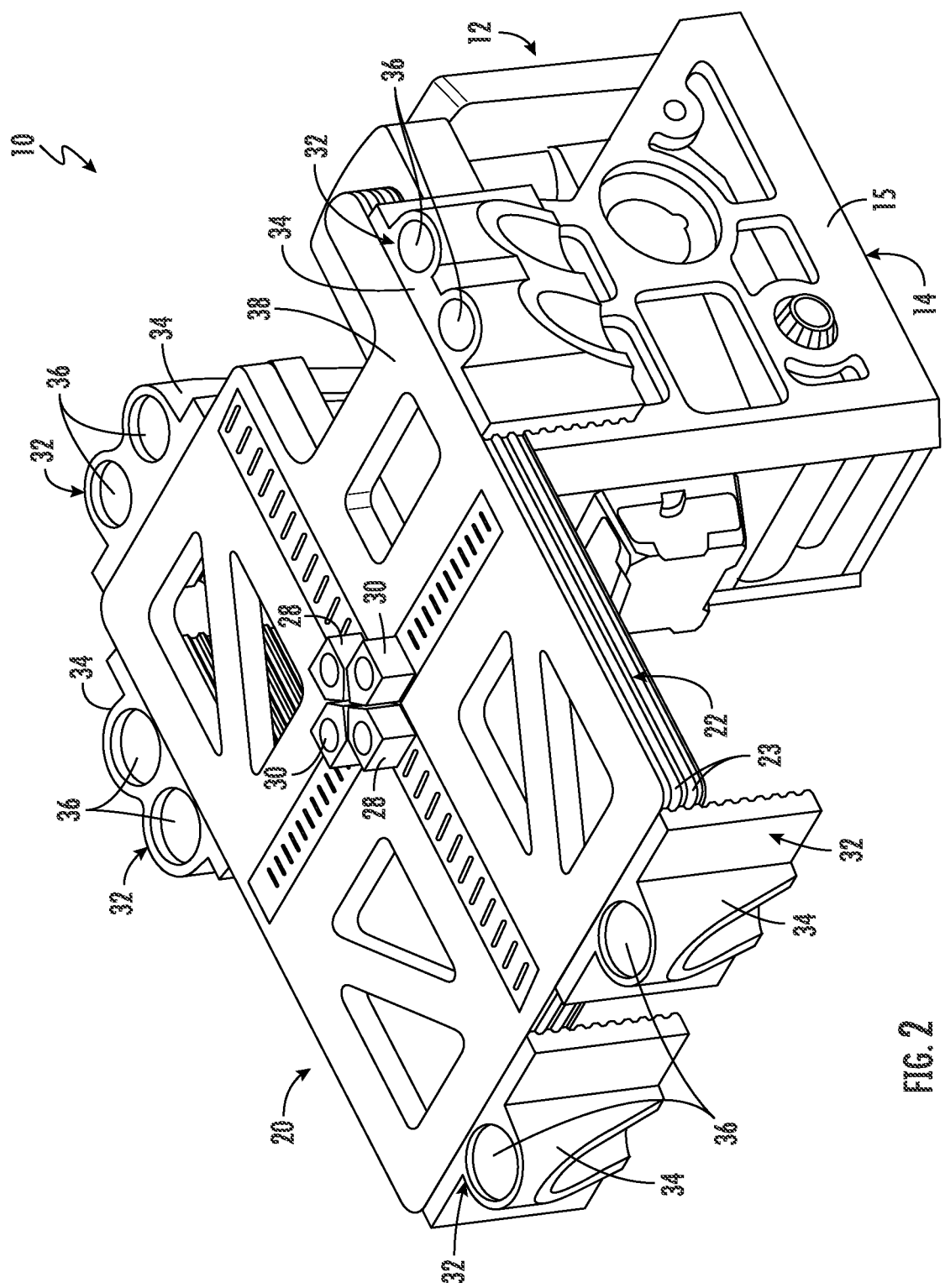
FIG. 2 is a perspective view from above of the laser level alignment tool of FIG. 1, according to an exemplary embodiment.

Referring to FIGS. 1 and 2, a laser level alignment tool, such as laser jig 10, is shown according to an exemplary embodiment. Laser jig 10 includes a body, shown as plate 20, having an outer sidewall surface 22, which defines the outer perimeter of plate 20. As shown in FIG. 2, a series of horizontal ribs 23 are formed in sidewall surface 22. Laser jig 10 includes a pair of central channels, shown as channels 24 and 26. In the embodiment shown, channels 24 and 26 are formed in the upper surface 38 and lower surface 40 of plate 20, perpendicular to each other, and intersect at center point 16.

A laser level, shown as multiplane, planar laser level 12, is coupled to and supported from laser jig 10 via frame 14. In the embodiment shown here, a bottom wall 13 of the frame 14 supports the planar laser level 12, and opposing sidewalls 15 extend from the bottom wall and couple to the lower surface 40. In this manner, frame 14 suspends laser level 12 from laser jig 10. As shown in FIG. 1, the mounting location of planar laser level 12 is off center relative to laser jig 10 such that a center of gravity of laser level 12 is offset from center point 16 and/or a center of gravity of laser jig 10.

Laser jig 10 includes a first pair of alignment features 28 adjustably coupled to a surface of plate 20, and specifically slidably coupled to channel 24, and a second pair of alignment features 30 coupled to a surface of plate 20, and specifically slidably coupled to channel 26. As shown in FIGS. 1 and 2, alignment features 28 and 30 are located in a first position adjacent center point 16. As shown for example in FIGS. 3 and 4, alignment features 28 and 30 are adjustable within channels 24 and 26 to a plurality of selectable positions away from center point 16 and closer to outer sidewall surfaces 22.

As will be discussed in more detail below, in use, this repositioning of alignment features 28 and 30 allows for centering of laser jig 10 within a hole (e.g., a lighting can) by engagement of alignment features 28 and 30 with edges of the hole.

Laser jig 10 includes a plurality of magnetic mounting structures, shown as magnet mounts 32, generally positioned and configured to allow laser jig 10 to be attached to a magnetic workpiece. Each magnet mount 32 includes a housing 34 and one or more magnets 36 coupled to the housing. In this embodiment, each of the one or more magnets 36 is positioned within at least a portion of the housing 34. Magnet mounts 32 are coupled to plate 20 at sidewall surfaces 22, such that magnet mounts 32 are positioned around the perimeter of plate 20. In this embodiment, magnet mounts 32 are specifically coupled to the exterior of sidewall surface 22. In this embodiment, the magnetic mounts 32 are positioned around multiple locations of the perimeter, specifically certain of the magnetic mounts 32 are diametrically opposed to one another. As noted above, Applicant has found that this perimeter location of magnet mounts 32 allows for robust support of laser jig 10 even with the off-center positioning of laser level 12.

In this design, magnet mounts 32 are separate from alignment features 28 and 30. In contrast to a design in which magnets are incorporated into alignment features 28 and 30, the present design allows for separate operation of magnet mounts 32 and alignment features 28 and 30. This this allows alignment features 28 and 30 to be used to align to non-magnetic workpieces while allowing laser jig 10 to be supported from magnetic structures adjacent the workpiece. In this embodiment, the alignment features 28 and 30 are non-magnetic.

As shown in FIG. 2, magnet mounts 32 are configured such that magnets 36 extend away from a first or upper surface 38 of plate 20. In this arrangement, laser level 12 extends from a second or lower surface 40 of plate 20 that is opposite of upper surface 38. In this manner, laser jig 10 attaches from one side to a workpiece with magnet mounts 32, and laser level 12 extends from the other side of laser jig 10 allowing laser light to be projected downward unobstructed for alignment purposes.

Figure 3:
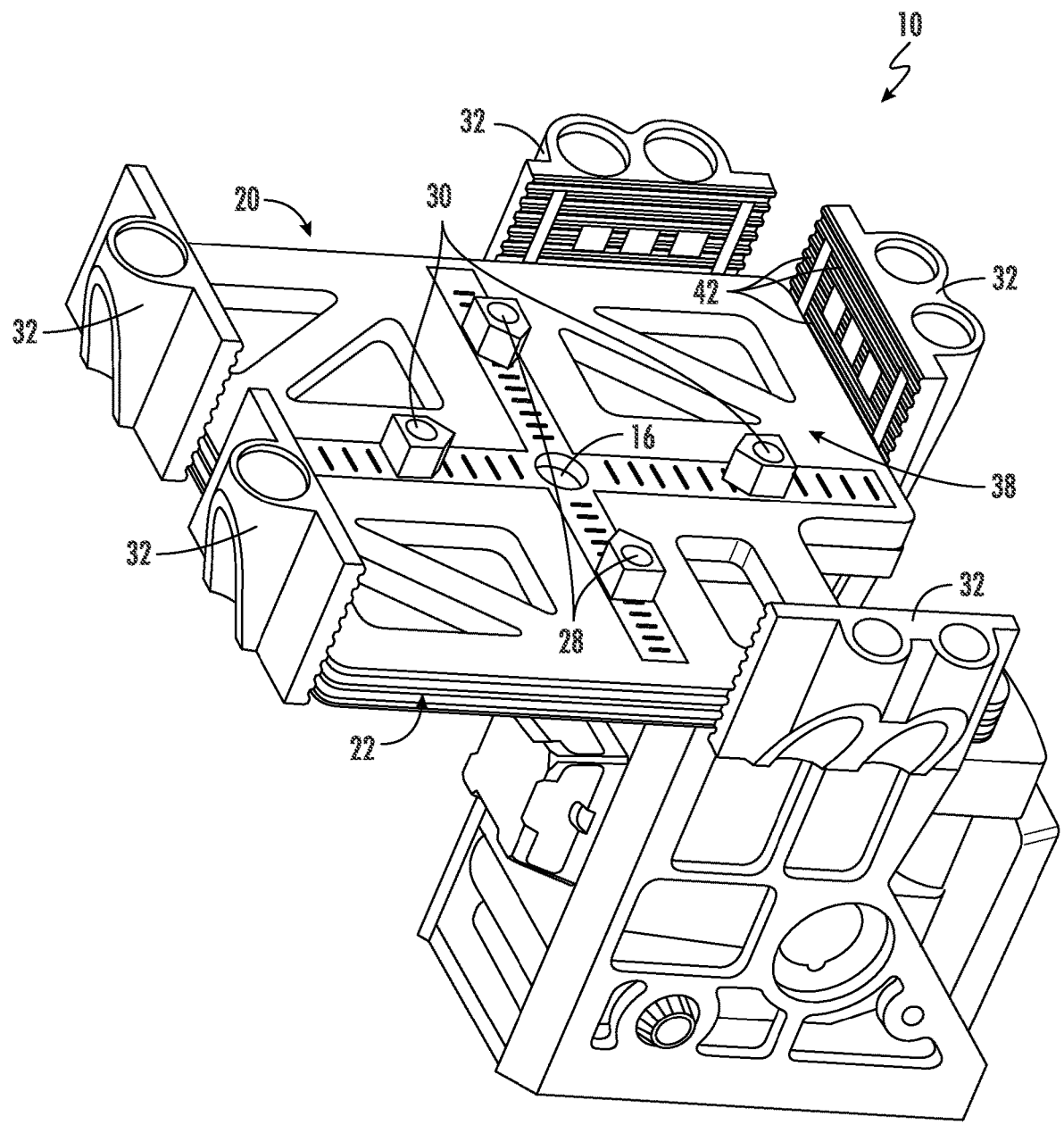
FIG. 3 is a perspective view from above of the laser level alignment tool of FIG. 2 with magnet mounts and alignment elements in extended positions, according to an exemplary embodiment.

To further facilitate placement of laser jig 10 in a wide variety arrangements, magnet mounts 32 are height adjustable relative to plate 20. Specifically, magnet mounts 32 are coupled to plate 20 for translation in a direction perpendicular to surface 38 and surface 40 of plate 20. FIG. 2 shows magnet mounts 32 is a first or lower height position relative to plate 20, and FIGS. 3 and 4 show magnet mounts 32 in a second or extended position in which magnet mounts 32 are translated away from upper surface 38 a distance D1.

Figure 4:
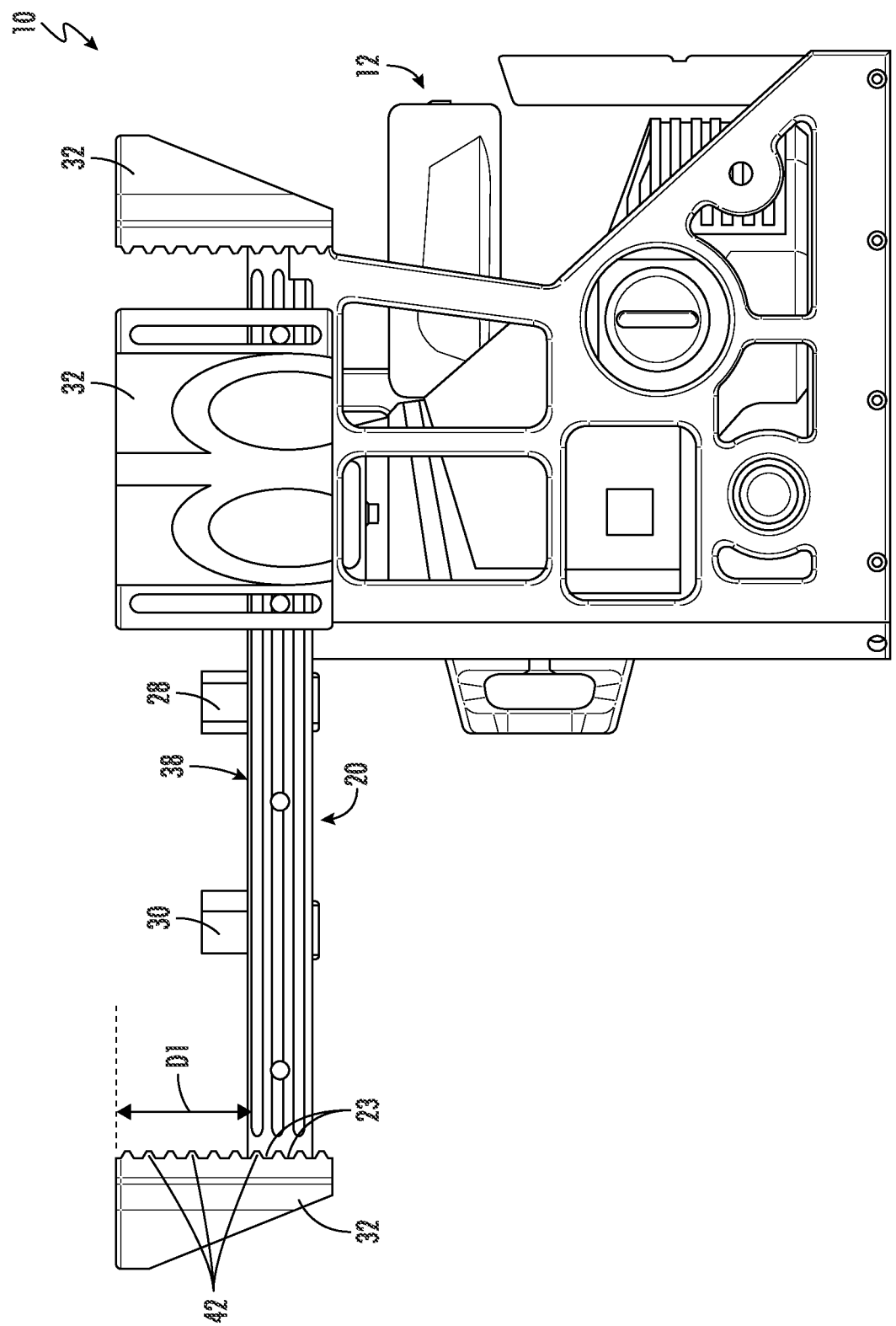
FIG. 4 is a side view of the laser level alignment tool of FIG. 3, according to an exemplary embodiment.

As shown best in FIG. 4, each magnet mount 32 includes side surface having a plurality of horizontal ribs 42 that engage plate 20. In this embodiment, horizontal ribs 42 specifically engage horizontal ribs 23 formed in the sidewall surface 22 of plate 20. This allows the magnet mounts to be selectively adjustable in a direction perpendicular to the upper surface. Here, horizontal ribs 42 provide for snap placement of magnet mounts 32 at a set preselect height level that facilitates setting of all magnet mounts 32 to the same height as each other. In other embodiments, the ribs 23 and 42 need not be horizontal and may take the form of other snap-fit structures that compliment one another to provide a selectively adjustable snap-fit connection, as described above.

Figure 5:
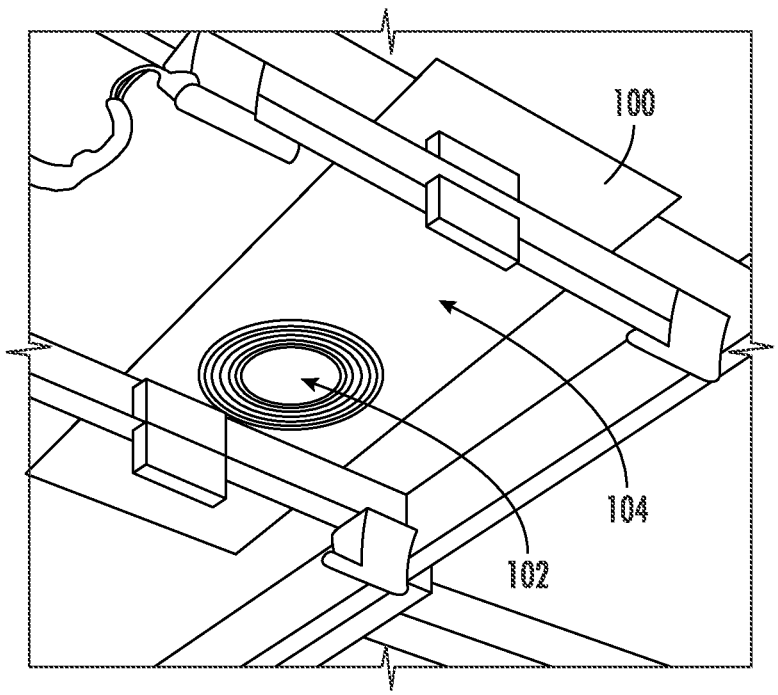
FIGS. 5 and 6 show a lighting location and use of the laser level alignment tool of FIG. 1, according to an exemplary embodiment.
Figure 6:
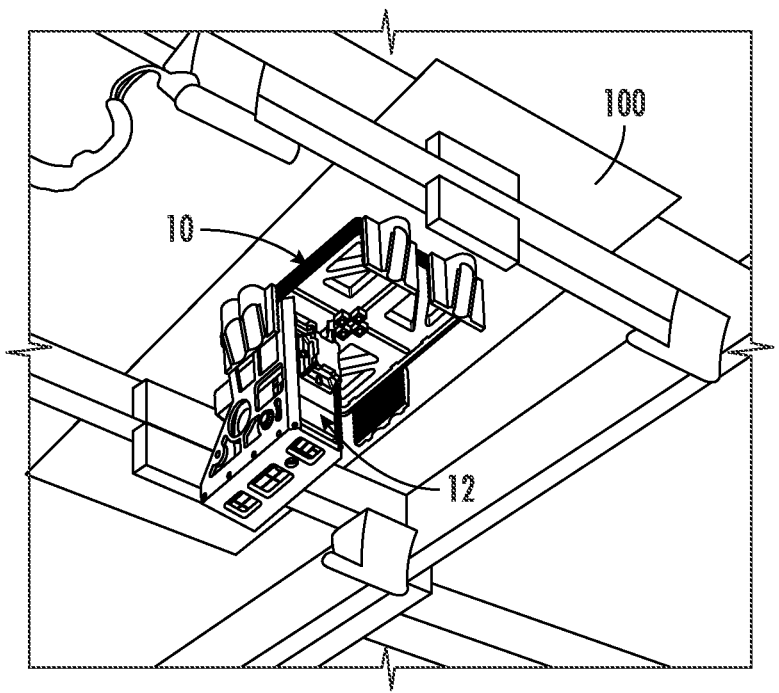

Referring to FIGS. 5 and 6, use of laser jig 10 is explained in conjunction with an exemplary workpiece shown, as lighting location 100. As shown in FIG. 5, a light location 100 includes a hole 102 formed in a surface 104. The desired positioning of lighting location 100 with a building is translated from plan or blueprint typically to a mark made on the floor below the desired placement of the light on the ceiling.

Alignment features 28 and 30 are moved outward along channels 24 and 26 such that they engage the edge defining the perimeter of hole 102, and magnet mounts 32 are positioned to attach laser jig 10 to the ceiling, while alignment features 28 and 30 are engaged with hole 102. Though the hole 102 shown in FIG. 5 is generally circular, the pairs of alignment features 28 and 30 could be adjusted to engage a hole having another shape, such as a square, a rectangle, or an oval, among others. For example, if fitting the alignment features to an ovular hole, alignment features 28 could each be adjusted a first distance from the center point 16 to engage points of the ovular hole that are closer to another and alignment features 30 could be each be adjusted a second distance from the center point 16 to engage points of the ovular hole that are further apart than the points engaged by alignment features 28. Thus, the first pair of alignment features 28 and the second pair of alignment features 30 are independently adjustable. Laser level 12 is activated projecting a downward laser beam (e.g., down dot, crossed planar beams, etc.) on to the floor, and an upward laser beam (e.g., up dot, crossed planar beams, etc.) upward through center point 16. Then lighting location 100 and laser jig 10 are repositioned as needed along the ceiling such that the projected downward laser beam is aligned with the reference mark on the floor. This provides position of lighting location 100 in the proper place set forth in the blueprint. Once aligned, the lighting location 100 is fixed/attached (e.g., via screws, nails, etc.) to the ceiling in the proper place per the building plan. In this manner, laser jig 10 provides for fast and efficient positioning of a workpiece in line with a reference mark.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A laser level alignment tool, comprising:
   a plate having a surface defined by an outer perimeter;
   a frame coupled to the plate, the frame configured to suspend a laser level from the plate;
   a first pair of alignment features adjustably coupled to the surface of the plate;
   a second pair of alignment features adjustably coupled to the surface of the plate, and
   a plurality of magnetic mounts coupled to the outer perimeter of the plate;
   wherein the first pair of alignment features and second pair of alignment features are slidably coupled to the surface of the plate such that the first pair of alignment features and second pair of alignment features are capable of moving translationally relative to the plate.

2. The laser level alignment tool of claim 1, wherein the first pair of alignment features and the second pair of alignment features are independently adjustable.

3. The laser level alignment tool of claim 1, wherein the first pair of alignment features and second pair of alignment features are non-magnetic.

4. The laser level alignment tool of claim 1, wherein the surface of the plate has a center point, wherein the first pair of alignment features comprises a first alignment feature and a second alignment feature, wherein the first alignment feature is adjustable between the center point and the outer perimeter, and wherein the second alignment feature is adjustable between the center point and the outer perimeter.

5. The laser level alignment tool of claim 4, wherein the surface of the plate forms a first channel that intersects the center point of the surface, and wherein the first pair of alignment features are adjustable along the first channel.

6. The laser level alignment tool of claim 5, wherein the surface of the plate forms a second channel that intersects the first channel at the center point of the surface, and wherein the second pair of alignment features are adjustable along the second channel.

7. A laser level alignment tool, comprising:
   a body configured to support a laser level, the body including:
   an upper surface,
   a lower surface opposite the upper surface, and
   a sidewall extending at least in part between the upper surface and the lower surface, the sidewall defining an outer perimeter of the body;
   a frame coupled to the body, the frame configured to support the laser level at least in part below the lower surface;
   a first magnetic mounting structure adjustably coupled to the exterior of the sidewall for translation in a direction perpendicular to the upper surface; and
   a second magnetic mounting structure adjustably coupled to the exterior of the sidewall for translation in a direction perpendicular to the upper surface, the second magnetic mounting structure spaced apart from the first magnetic mounting structure.

8. The laser level alignment tool of claim 7, wherein the first magnetic mounting structure is coupled to the exterior of the sidewall at a position diametrically opposed to the position at which the second magnetic mounting structure is coupled to the exterior of the sidewall.

9. The laser level alignment tool of claim 7, wherein the first magnetic mounting structure further includes a first housing having a side surface that engages the exterior of the sidewall, and a first magnet positioned within the first housing.

10. The laser level alignment tool of claim 9, wherein the first magnetic mounting structure further includes a second magnet positioned within the first housing, and wherein the first magnet and the second magnet are coupled to the first housing.

11. The laser level alignment tool of claim 7, wherein a plurality of horizontal sidewall ribs are formed along the exterior of the sidewall, wherein the first magnetic mounting structure includes a side surface that engages the exterior of the sidewall, wherein the side surface includes a plurality of horizontal side surface ribs that engage the plurality of horizontal sidewall ribs.

12. The laser level alignment tool of claim 11, wherein the horizontal side surface ribs are configured to engage the plurality of horizontal sidewall ribs in a first position in which the first magnetic mounting structure extends a first distance above the upper surface, and in a second position in which the first magnetic mounting structure extends a second distance above the upper surface, and wherein the second distance is different than the first distance.

13. A laser level alignment tool, comprising:
a plate having a plate center of gravity and a plate center point, the plate including:
an upper surface,
a lower surface, and
a sidewall extending between the upper surface and the lower surface;
a frame coupled to the lower surface, the frame configured to support a laser level having a laser level center of gravity in a position such that the laser level center of gravity is offset from the plate center of gravity;
a plurality of adjustable alignment features coupled to at least the upper surface such that the plurality of adjustable alignment features are capable of moving translationally relative to the upper surface; and
a plurality of magnetic mounts coupled to the sidewall.

14. The laser level alignment tool of claim 13, wherein the plurality of adjustable alignment features extend upward from the upper surface and downward from the lower surface.

15. The laser level alignment tool of claim 13, wherein the frame is further configured to support the laser level in a position such that a laser beam generated by the laser level is alignable with a reference mark positioned below the lower surface of the plate.

16. The laser level alignment tool of claim 13, where the frame includes a bottom wall configured to support the laser level, and a pair of opposing sidewalls extend from the bottom wall and couple to the lower surface.

17. The laser level alignment tool of claim 13, wherein the plurality of magnetic mounts selectively adjustable with respect to the sidewall in a direction perpendicular to the upper surface.

18. The laser level alignment tool of claim 13, wherein the plurality of adjustable alignment features comprises a first adjustable alignment feature that is adjustable along the upper surface from a first position adjacent the plate center point to a second position spaced apart from the plate center point.

19. The laser level alignment tool of claim 18, wherein the plurality of adjustable alignment features comprises a second adjustable alignment feature that is adjustable along at least the upper surface from a third position adjacent the plate center point to a fourth position spaced apart from the plate center point and spaced apart from the second position.

* * * * *